Sept. 16, 1952        R. E. KELLY        2,610,522
BELT PULLEY CONTROLLER FOR TRACTORS
Filed Sept. 15, 1947
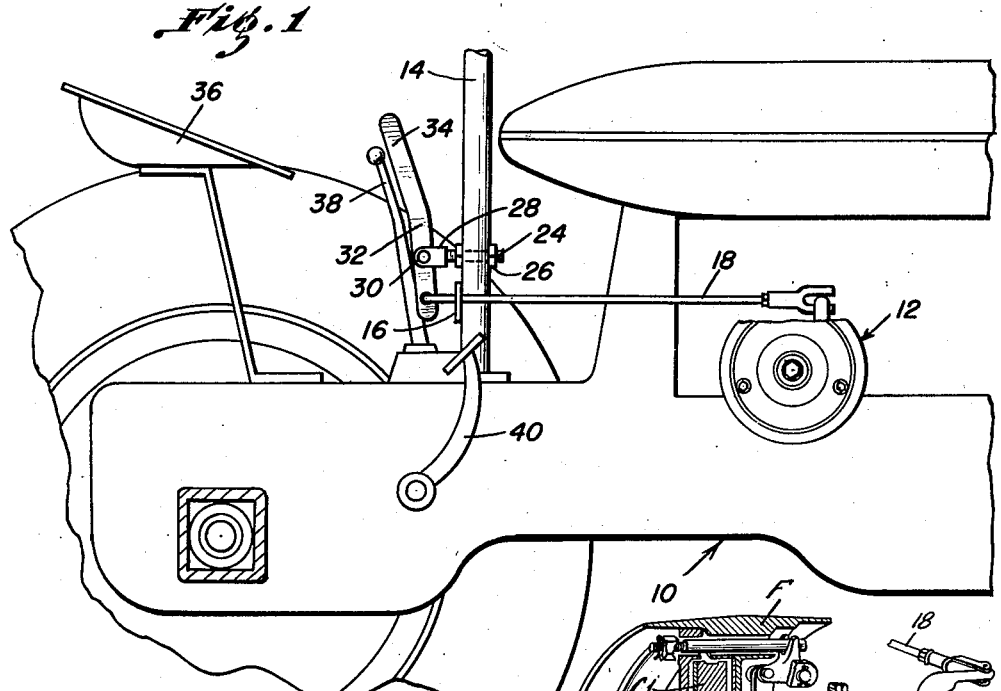
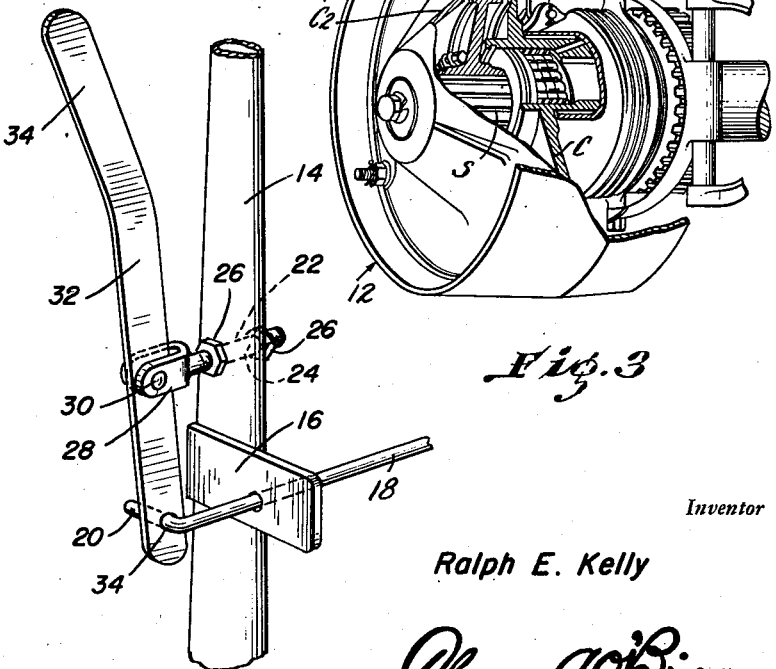
Inventor
Ralph E. Kelly
By *Clarence A. O'Brien and Harvey B. Jacobson*
Attorneys Patented Sept. 16, 1952

2,610,522

UNITED STATES PATENT OFFICE 2,610,522

BELT PULLEY CONTROLLER FOR TRACTORS

Ralph E. Kelly, Alvord, Iowa

Application September 15, 1947, Serial No. 774,072

3 Claims. (Cl. 74—491)

This invention relates to new and useful improvements in belt pulley clutch controllers for tractors and the primary object of the present invention is to provide a lever for conveniently actuating the belt pulley clutch control rod of a tractor.

Another important object of the present invention is to provide an attachment for tractors so designed as to permit the belt pulley clutch control rod to be actuated by a person that is seated in a normal position on the tractor.

A further object of the present invention is to provide a belt pulley clutch controller that is quickly and readily applied to a supporting post of a tractor and which is conveniently applied to the belt pulley clutch operating rod without in any way having to remove any of the normal structure present on a tractor in order to apply the device thereon.

A still further aim of the present invention is to provide a belt pulley clutch controller for tractors that is simple and practical in construction, strong and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary side elevational view of a tractor showing the present invention applied in position thereon, and with parts of the tractor broken away and shown in section;

Figure 2 is a perspective view of the present invention applied to a supporting post of a tractor and connected to the belt pulley clutch actuating rod, and with parts of the post and rod broken away and shown in section; and, Figure 3 is a detail sectional view of a conventional belt pulley unit of a well known type of tractor.

Referring now to the drawing in detail, wherein for the purpose of illustration, there is disclosed a preferred embodiment of the present invention, the numeral 10 represents a tractor generally comprising a belt pulley unit 12, an upstanding supporting post 14, a guide plate 16 rigidly carried by the post and a belt pulley clutch actuating rod 18 slidably mounted on plate 16. One end of the rod 18 is turned outwardly to provide a stop or lateral projection portion 20 preventing disengagement of the rod with the plate 16. The present invention does not attempt to claim the above conventional structure, but it is merely an attachment to be used in conjunction with the post 14 and rod 18.

A bore 22 is provided through the post 14, above plate 16, and receives a screw threaded rod or bolt 24 on which are adjustably mounted jam nuts 26 that are adjusted to bear against diametrically opposite sides of the post for lockably securing the rod 24 relative to the post 14.

A substantially U-shaped or bifurcated member 28 is rigidly carried by one terminal of the rod 24, and is pivoted, as at 30, to a lever 32 adjacent one end of the lever. The lower end of this lever is provided with an aperture 34 that receives the outturned end portion 20 of rod 18, and the opposite and upper end of the lever is inclined upwardly and rearwardly to provide a hand receiving portion 34.

In practical use of the device, the post 14 is located relatively close to the seat 36 of the tractor, to the gear shift 38 of the tractor, and near the foot pedal of the tractor. Heretofore, it has been necessary for the operator to bend over in order to grasp the end 20 of the rod 18 for controlling the belt pulley 12. However, by the use of the present lever 32, the operator, although an over average weight person, may conveniently reach the lever for easily and readily actuating the belt pulley clutch operating rod 18.

It should be noted that the belt pulley mechanism 12, being of a known and conventional construction has mounted therein a clutch plate C1 that is keyed on the power take-off shaft S of the tractor. The pulley mechanism is also composed of two clutch plates C and C2 that are journalled for rotation on the shaft S. One of the clutch plates C is slidable on the shaft S and the other of the clutch plates, C2, is a permanent part of the belt receiving flange F of the pulley.

The slidable clutch plate C is connected to the actuating bar 18, as shown in Figure 3, so that as the bar 18 is moved forwardly, the clutch plate C will move against the clutch plate C1 and the clutch plate C1 will be moved against the clutch plate whereupon the clutch plates C, C1 and C2 will rotate as a unit to drive a belt (not shown) about the flange F.

In view of the foregoing description taken in conjunction with the accompanying drawing it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having thus described the invention, what is claimed as new is:

1. In combination with a tractor including a supporting post, a belt pulley unit mounted in front of the post and including a clutch mechanism, an operating rod having a forward end attached to the clutch mechanism for actuating the clutch mechanism and a guide mounted on the post and slidably receiving the rod; the improvement of which comprises a fulcrum removably secured to and projecting laterally from the post, and a lever pivoted to the fulcrum and connected to the rear end of the rod.

2. In combination with a tractor including a supporting post, a belt pulley unit mounted in front of the post and including a clutch mechanism, an operating rod having a forward end attached to the clutch mechanism for actuating the clutch mechanism and a guide mounted on the post and slidably receiving the rod; the improvement of which comprises a fulcrum including a bolt having a bifurcated end portion, said post having a transverse opening receiving said bolt, means mounted on the bolt and securing the bolt to the post, a lever having upper and lower portions, and a pivot pin securing the lever to the bifurcated end portion, the lower end portion of said lever being connected to the rear end of the rod.

3. In combination with a tractor including a supporting post, a belt pulley unit mounted in front of the post and including a clutch mechanism, an operating rod for actuating the clutch mechanism and a guide mounted on the post and slidably receiving the rod; the improvement of which comprises a fulcrum including a bolt having a bifurcated end portion, said post having a transverse opening receiving said bolt, a pair of nuts threaded on said bolt and holding the bolt on the post, a lever having upper and lower ends and a central portion, and a pivot pin securing the central portion of the lever to the bifurcated end portion, the lower end of said lever having an aperture, and said rod having a forward end attached to the clutch mechanism having a laterally projecting rear end portion received in said aperture.

RALPH E. KELLY.

REFERENCES CITED

The following references are of record in the file of this patent:

UNITED STATES PATENTS

| Number | Name | Date |
|---|---|---|
| 37,577 | Hathaway | Feb. 3, 1863 |
| 757,751 | Kessler | Apr. 19, 1904 |
| 1,166,787 | Russell | Jan. 4, 1916 |
| 1,228,980 | Smith | June 5, 1917 |
| 1,331,426 | Fergus | Feb. 17, 1920 |
| 1,387,775 | Headly | Aug. 16, 1921 |
| 1,407,458 | Berry | Feb. 21, 1922 |
| 1,550,920 | Morsch | Aug. 25, 1925 |
| 1,631,929 | England | June 7, 1927 |
| 1,707,219 | Cook | Apr. 2, 1929 |
| 1,778,610 | Schmidt | Oct. 14, 1930 |
| 2,354,883 | Schonberg | Aug. 1, 1944 |